(12) United States Patent
Oetken

(10) Patent No.: US 9,103,077 B2
(45) Date of Patent: Aug. 11, 2015

(54) VIBRATORY MECHANISM INCLUDING DOUBLE HELICAL KEY SHAFT, COMPACTOR INCLUDING VIBRATORY MECHANISM, AND METHOD OF OPERATING A VIBRATORY MECHANISM

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 48 days.

(21) Appl. No.: 14/146,963

(22) Filed: Jan. 3, 2014

(65) Prior Publication Data

US 2015/0191880 A1    Jul. 9, 2015

(51) Int. Cl.
*E01C 19/28* (2006.01)
*F16H 25/08* (2006.01)

(52) U.S. Cl.
CPC ............. *E01C 19/286* (2013.01); *E01C 19/282* (2013.01); *F16H 25/08* (2013.01)

(58) Field of Classification Search
CPC ...... E01C 19/282; E01C 19/286; F16H 25/08
USPC ............................................ 404/72, 117, 122
See application file for complete search history.

(56) References Cited

U.S. PATENT DOCUMENTS

| | | | |
|---|---|---|---|
| 3,145,631 A * | 8/1964 | Green | 404/117 |
| 4,350,460 A | 9/1982 | Schmelzer et al. | |
| 4,454,780 A * | 6/1984 | Goehler et al. | 74/87 |
| 4,568,218 A | 2/1986 | Orzal | |
| 5,177,386 A | 1/1993 | Shimada | |
| 5,594,427 A * | 1/1997 | Kim et al. | 340/12.22 |
| 8,393,826 B1 | 3/2013 | Marsolek et al. | |
| 8,556,039 B2 | 10/2013 | Marsolek et al. | |
| 2011/0158745 A1 | 6/2011 | Oetken et al. | |

* cited by examiner

*Primary Examiner* — Raymond W Addie
(74) *Attorney, Agent, or Firm* — Leydig, Voit & Mayer, Ltd.

(57) ABSTRACT

A vibratory mechanism for a compaction machine, the vibratory mechanism including first and second eccentrics, and a key shaft including oppositely helically splined portions. The first helically splined portion is complimentary to and disposed at least partially within a first internally helically splined bore of the first eccentric. The second helically splined portion is complimentary to and disposed at least partially within second internally helically splined bore of the second eccentric. The key shaft is disposed to linearly translate within the helically spined bores to cause the second eccentric to rotate in a direction opposite the first eccentric.

18 Claims, 5 Drawing Sheets

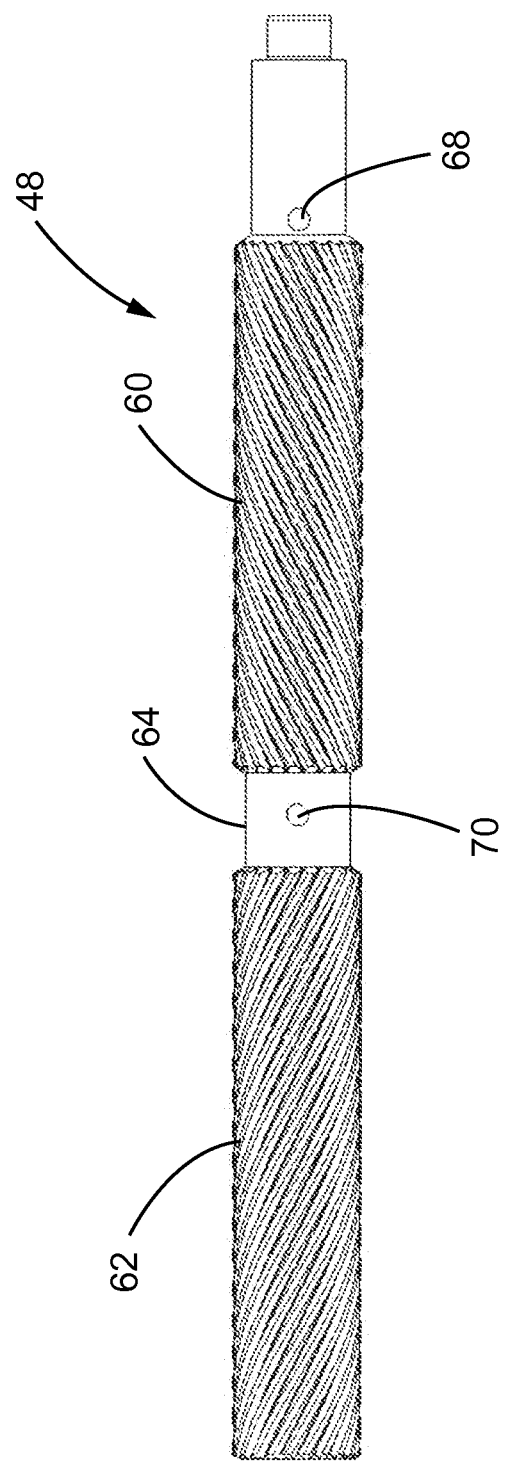

VIBRATORY MECHANISM INCLUDING DOUBLE HELICAL KEY SHAFT, COMPACTOR INCLUDING VIBRATORY MECHANISM, AND METHOD OF OPERATING A VIBRATORY MECHANISM

TECHNICAL FIELD

This patent disclosure relates generally to vibratory compaction machine, and, more particularly to a vibratory mechanism including a key shaft.

BACKGROUND

Compaction machines are frequently employed for compacting fresh laid asphalt, soil or other compactable materials. One such type of compaction machine is a drum-type compactor having one or more drums that compacts material over which the compactor is driven. In order to compact the material, these drum-type compactors include a drum assembly having a vibratory mechanism.

In U.S. Pat. No. 8,556,039 to Marsolek et al., the vibratory mechanism includes inner and outer eccentric weights arranged on a rotatable shaft or a key shaft. The key shaft is positioned within an inner cavity of the inner eccentric weight such that as the key shaft rotates, it causes the rotation of the inner and the outer eccentric weights to induce vibrations on the drum for compacting material. In order to facilitate rotation of the inner and the outer eccentric weights, the outer surface of the key shaft is provided with axial or straight splined portions that engage with the inner eccentric weight, as well as helical splined portions that engage with the outer eccentric weight to facilitate rotation of those eccentrics. A linear actuator reciprocates the key shaft during operation.

SUMMARY

The disclosure describes, in one aspect, a vibratory mechanism for a compaction machine. The vibratory mechanism includes first and second eccentrics and a key shaft. The first eccentric defines a first internally helically splined bore. The second eccentric defines a second internally helically splined bore. The key shaft includes a first helically splined portion and a second helically splined portion, wherein the first and second helically splined portions are oppositely splined. The first helically splined portion is complimentary to and disposed at least partially within the first internally helically splined bore. The second helically splined portion is complimentary to and disposed at least partially within the second internally helically splined bore.

In another aspect, the disclosure describes a compaction machine. The compaction machine includes a main frame, at least one compaction drum, and a vibratory mechanism is associated with the compaction drum. The vibratory mechanism includes first and second eccentrics and a key shaft. The first eccentric defines a first internally helically splined bore. The second eccentric defines a second internally helically splined bore. The key shaft includes a first helically splined portion and a second helically splined portion. The first helically splined portion is complimentary to and disposed at least partially within the first internally helically splined bore. The second helically splined portion is complimentary to and disposed at least partially within the second internally helically splined bore. The first and second helically splined portions are oppositely splined.

In yet another aspect, the disclosure describes a method of operating a vibratory mechanism of a compaction machine. The method includes the steps of disposing a first eccentric within a roller of the compaction machine; disposing a second eccentric substantially within the first eccentric; disposing a first helically splined portion of a key shaft at least partially within a first internally helically splined bore in the first eccentric, and disposing a second helically splined portion of the key shaft at least partially within a second internally helically splined bore in the second eccentric, the first and second helically splined portions being oppositely splined; providing rotation to the first eccentric, the first eccentric providing rotary motion to the key shaft by way of the first helically splined bore engaging with the first helically splined portion; and linearly traversing the key shaft to provide rotary motion to the second eccentric in a rotary direction opposite to a direction of rotation of the first eccentric.

BRIEF DESCRIPTION OF THE DRAWING(S)

FIG. 5 is a side view of the key shaft of FIG. 4.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
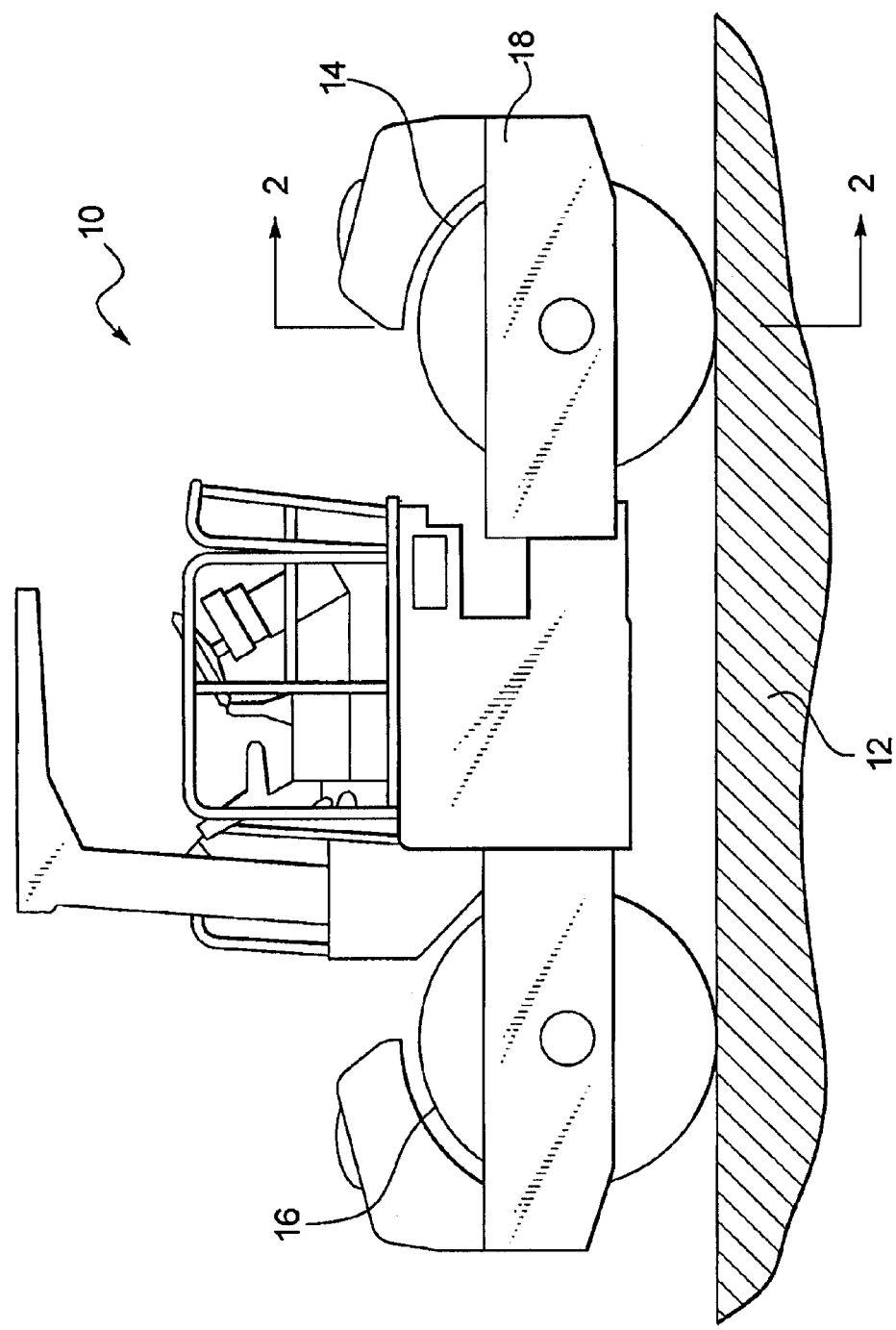
FIG. 1 is a schematic side view of an exemplary compaction machine, in accordance with at least some embodiments of the present disclosure.

This disclosure relates to a vibratory mechanism for a compaction machine 10. Referring now to FIG. 1, a compaction machine 10 is shown, in accordance with at least some embodiments of the present disclosure. The illustrated compaction machine 10 uses double drum vibratory compaction for compacting and/or increasing the density of a compactable material or mat 12, such as, soil, gravel, and bituminous mixtures. While all the components of the compaction machine 10 have not been shown and/or described, a typical compaction machine may include front and rear compacting drums 14 and 16, respectively, mounted on a main frame 18. The main frame 18 may also support an engine, one or more electrical generators, fluid pumps and/or other power sources, as well as other mechanical and electrical controls for the compaction machine 10. Several components other than those described above and those that are commonly employed in combination or conjunction with such compaction machines are contemplated and considered within the scope of the present disclosure. Furthermore, although the compaction machine 10 is shown as being a double drum machine, in at least some embodiments, the compaction machine may be a single drum machine, or may employ more than two drums.

Figure 2:
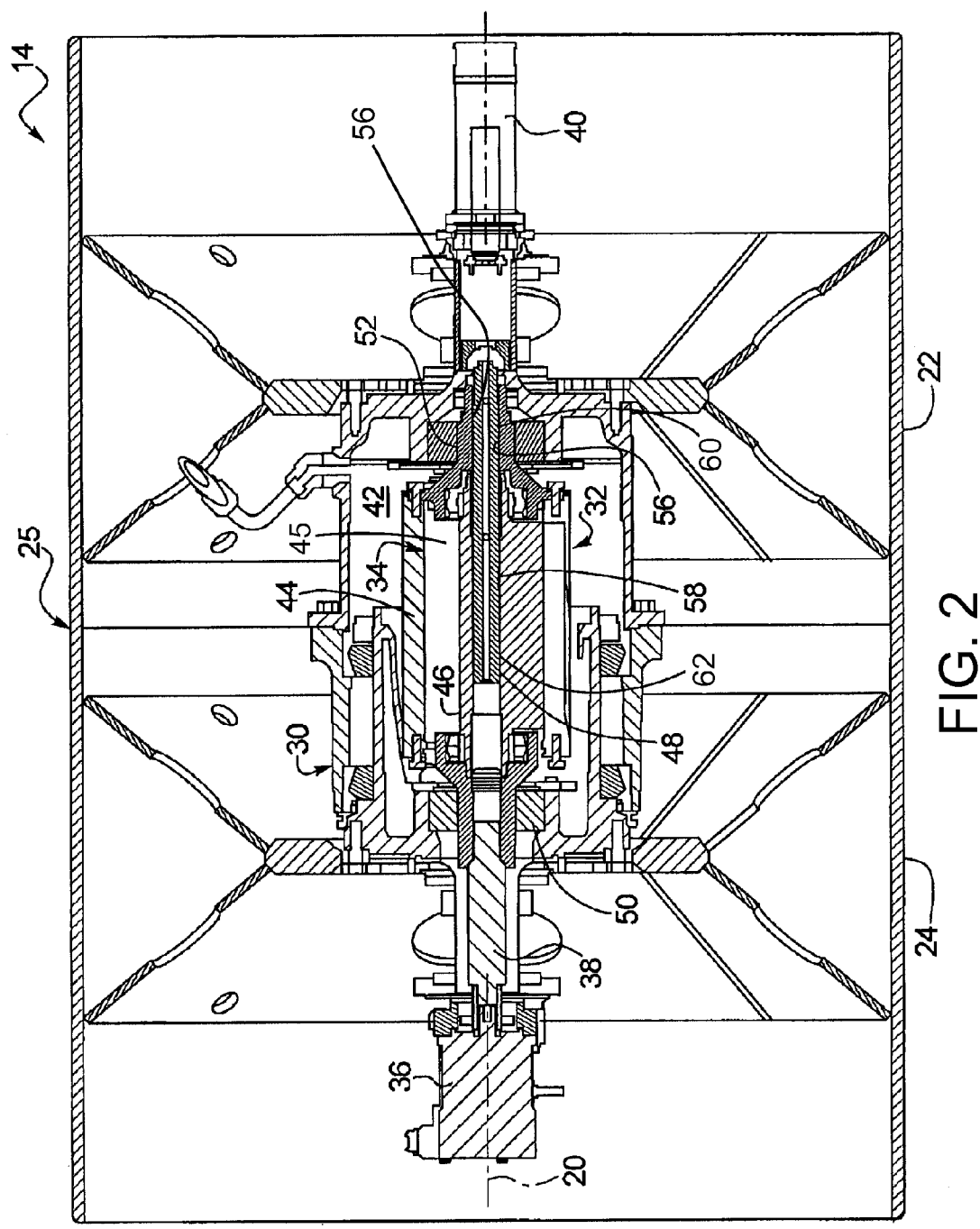
FIG. 2 is an axial rear cross-sectional view taken along lines 2-2 of FIG. 1 and showing a vibratory system employed within the compaction machine of FIG. 1, in accordance with at least some embodiments of the present disclosure.
Figure 3:
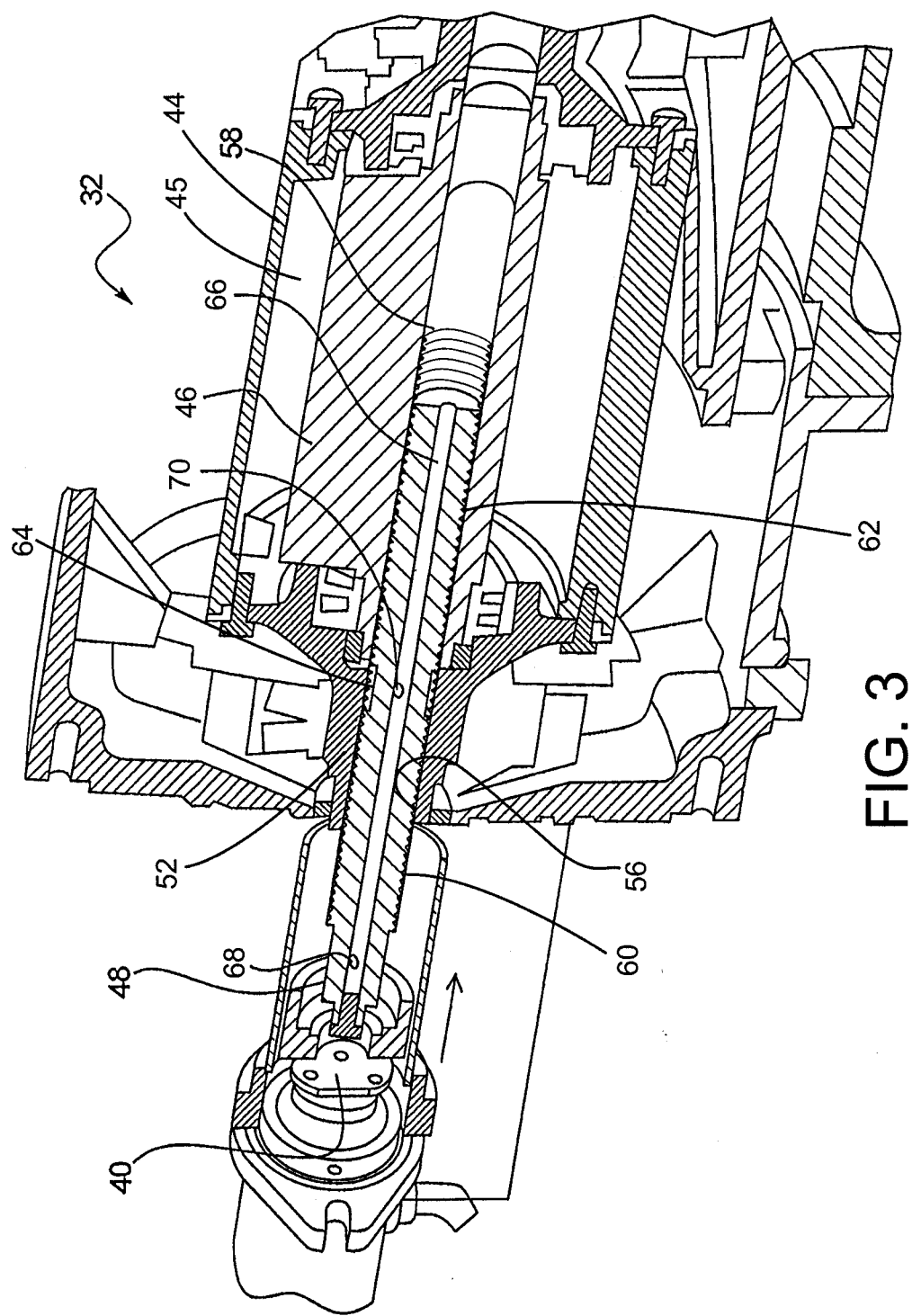
FIG. 3 is a fragmentary isometric front cross-sectional view of the vibratory system of FIG. 2.

Turning now to FIGS. 2 and 3, FIG. 2 shows a cross-sectional view of the front compacting drum 14 taken from the rear of the drum 14 along lines 2-2 of FIG. 1, while FIG. 3 shows a fragmentary isometric cross-sectional view from the front of the drum 14. FIGS. 2 and 3 show various components of the compacting drum 14 in accordance with at least some embodiments of the present disclosure. Although the cross-sectional view of only the front compacting drum 14 has been shown and described herein, it will be understood that the same teachings are equally applicable to the rear compacting drum 16 as well, given especially that the front and the rear compacting drums are structurally and operatively similar. Furthermore, the description of only those components of the front compacting drum 14 that are required for a proper understanding of the present disclosure is provided below.

Thus, as shown in FIG. 2, the front compacting drum 14 is supported for rotation about an axis 20, and may include two drum sections 22 and 24 separated by a split 25 to define a split-drum configuration. In at least some embodiments, the front compacting drum 14 may be configured as a solid-drum configuration with no split. Among other components, the drum sections 22 and 24 may include a support arrangement 30 for connecting and rotating those drums sections in relation to one another. The support arrangement 30 may additionally house a vibratory system 32, described below.

In at least some embodiments, the vibratory system 32 may include a vibratory mechanism 34, a vibratory motor 36, a drive shaft 38 and a linear actuator (or cylinder) 40, all or a portion of which may be partially or completely housed within a housing 42. The vibratory motor 36 may be disposed and coupled to rotate the drive shaft 38, which in turn may drive and rotate the vibratory mechanism 34 in conjunction with the linear actuator 40. The vibratory mechanism 34 may include a first or outer eccentric 44, a second or inner eccentric 46 and a key shaft 48 connected in operational association. The inner eccentric 46 may be positioned within an internal space 45 of the outer eccentric 44 and may be rotatably supported about an axis, here, the drum axis 20.

In the illustrated embodiment, the outer eccentric 44 may include a drive side stub shaft 50 connected to the drive shaft 38 such that rotation of the drive shaft 38 imparts rotation to the outer eccentric 44. The first or outer eccentric 44 may additionally include a helical side stub shaft 52 defining a first, internally splined bore 56. It will be appreciated that two or more of the components of the outer eccentric 44 may be fabricated as a single unit.

Figure 4:
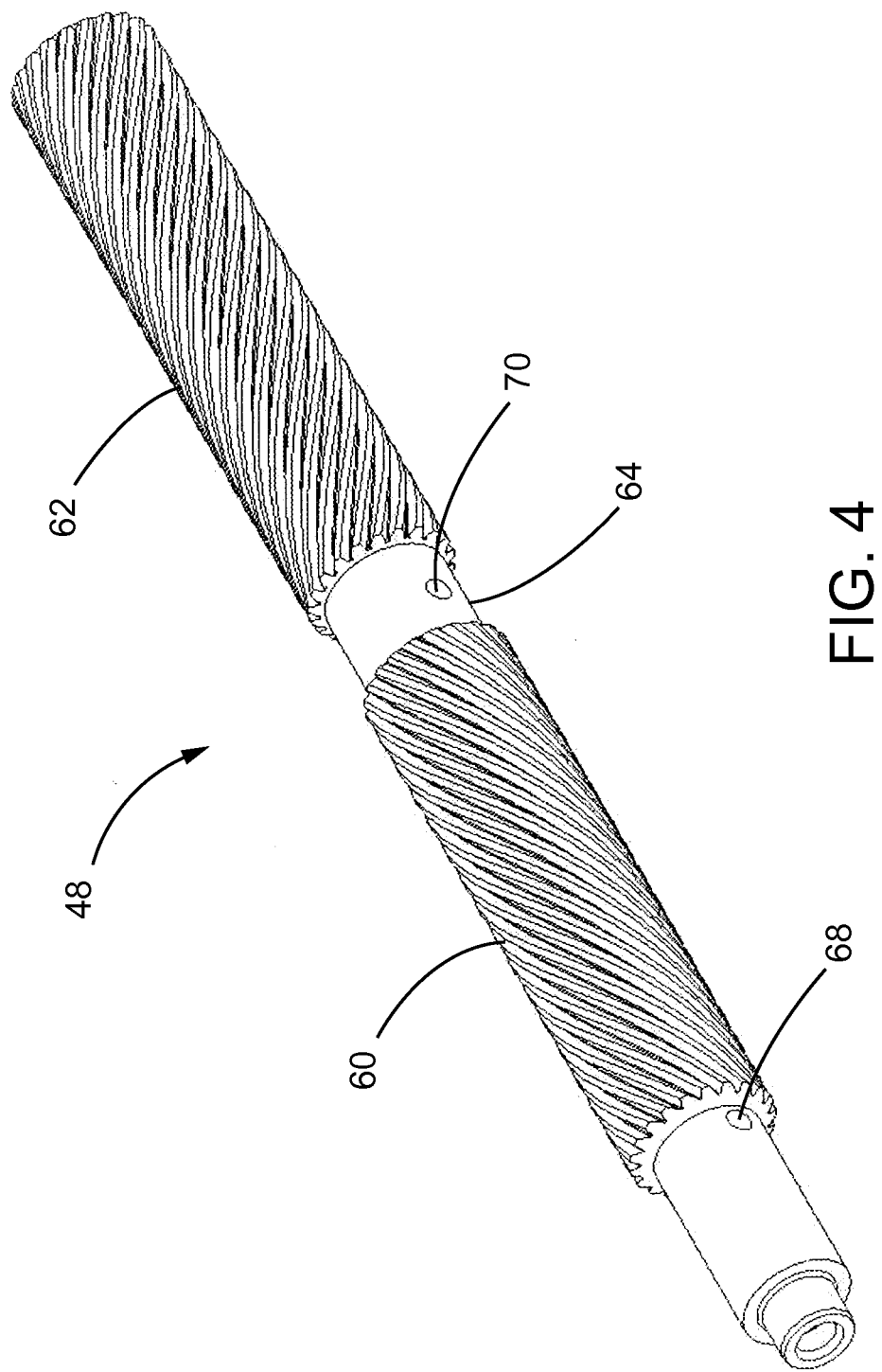
FIG. 4 is an isometric view of a key shaft in accordance with teachings of the disclosure.

A key shaft 48 may be disposed within and engaged with the internally splined bore 56 of the helical side stub shaft 52 of the outer eccentric 44. In the illustrated embodiment, the key shaft 48 is disposed along the drum axis 20, although it could be alternately positioned. Referring now to FIGS. 4 and 5 in conjunction with FIGS. 2 and 3, the key shaft 48 may be a solid, hollow or substantially or partially hollow shaft having a first splined portion 60, and a second splined portion 62. In some embodiments, the key shaft 48 may include one or more smooth portions 64 that, for example, separate the first and second splined portions 60, 62. In the embodiments that are completely, substantially, or partially hollow, the key shaft 48 may have one or several lubrication passages 66, 68, 70 through which lubricant by be provided to lubricate the interfaces between the key shaft 48 and the outer and inner eccentrics 44, 46.

In order to receive and engage with the key shaft 48, the second or inner eccentric 46 may likewise be provided with a second bore (e.g., an axial bore) 58. The bore 58 of the inner eccentric 46 may be provided with one or more splines along at least a portion of the bore 58 that engages with the second splined portion 62 of the key shaft 48. The key shaft 48 may be positioned within the internally splined bore 58 of the inner eccentric 46 and the internally splined bore 56 of the outer eccentric 44 to engage with both the inner eccentric 46 and the outer eccentric 44 to facilitate rotation of the vibratory mechanism 34. Specifically, the key shaft 48 may be positioned within the bores 56, 58 such that the first splined portion 60 of the key shaft 48 may engage the splines of the bore 56 of the outer eccentric 44, while the second splined portion 62 of the key shaft 48 may engage with the splines of the bore 58 of the inner eccentric 46. The key shaft 48 may additionally be connected at an end portion thereof to the linear actuator 40, which may facilitate linear motion of the key shaft 48. For the purposes of this disclosure, linear motion of the key shaft 48 means linear motion in an axial direction of the key shaft 48.

According to an aspect of the arrangement, the splined portions 60, 62 of the key shaft 48 are helically splined in opposed directions. The splines of the engaging bores 56, 58 are matingly arranged with the splined portions 60, 62, respectively, such that rotation of the drive shaft 38 may result in rotation of the inner eccentric 46. In this way, rotation of the outer eccentric 44 imparts rotation to the key shaft 48, while the linear actuator 40 facilitates the linear motion of the key shaft 48 within the inner and outer eccentrics 46, 44 as the outer eccentric 44 imparts rotation to the key shaft 48, which imparts rotation to the inner eccentric 46.

In operation, as the key shaft 48 reciprocates linearly within the bore 58 of the inner eccentric 46 as the outer eccentric 44 applies rotation to the key shaft 48. In view of the opposed directions of the helical spline interfaces between each of the outer and inner eccentrics 44, 46 and key shaft 48, as the outer eccentric 44 rotates in a first direction, the inner eccentric 46 will rotate in an opposite second direction. It will be appreciated that the relative rotational speeds of the outer and inner eccentrics 44, 46 will depend, at least in part, upon respective pitches and diameters of the splined portions 62, 60 of the drive shaft 38, as well as the rotational speed imparted to the drive shaft 38.

More specifically, as the helical spline of the helical bore 56 of the helical stub shaft 52 engages the first helical splined portion 60 of the key shaft 48, and the linear actuator or cylinder 40 reciprocates the key shaft 48, the helical spline interface of the helical stub shaft 52 with the key shaft 48 and the movement of the linear actuator or cylinder 40 create linear and rotary motions of the key shaft 48 within the inner eccentric 46. These linear and rotary motions of the key shaft 48 are further converted into a rotational motion of the axially fixed inner eccentric 46 by way of the helical interface between the second helical splined portion 62 of the key shaft 48 with the helical internal splines of the engaging bore 58 of the inner eccentric 46.

INDUSTRIAL APPLICABILITY

The present disclosure is applicable to compaction machines 10 that include at least one vibratory mechanism 34.

In some embodiments, the disclosed vibratory mechanism 34 may provide phase shifts of the first and second eccentrics 44, 46 associated with a reduced linear movement of the key shaft 48. Accordingly, the disclosed vibratory mechanism 34 may assist in alleviating space constraints. As a result, some embodiments may be appropriate for use in smaller machines, for example.

Some embodiments of the disclosed vibratory mechanism 34 achieve such advantages in a cost effective manner.

While only certain embodiments have been set forth, alternatives and modifications will be apparent from the above description to those skilled in the art. These and other alternatives are considered equivalents and within the spirit and scope of this disclosure and the appended claims.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A vibratory mechanism for a compaction machine, the vibratory mechanism comprising:
   a first eccentric defining a first internally helically splined bore therein;
   a second eccentric defining a second internally helically splined bore therein; and
   a key shaft including a first helically splined portion and a second helically splined portion, the first helically splined portion being complimentary to and disposed at least partially within the first internally helically splined bore, the second helically splined portion being complimentary to and disposed at least partially within the second internally helically splined bore, the first and second helically splined portions being oppositely splined wherein the first eccentric is adapted to provide rotary motion to the key shaft, and the key shaft is adapted to provide rotary motion to the second eccentric.

2. The vibratory mechanism of claim 1 wherein the first eccentric includes an internal space, and the second eccentric is disposed substantially within the internal space.

3. The vibratory mechanism of claim 1 wherein the key shaft is disposed for linear movement.

4. The vibratory mechanism of claim 3 further comprising a linear actuator disposed to provide linear movement to the key shaft.

5. The vibratory mechanism of claim 1 further comprising a motor disposed to provide rotary movement to the first eccentric.

6. The vibratory mechanism of claim 1 wherein the first and second helically splined portions have substantially like pitches disposed oppositely.

7. The vibratory mechanism of claim 1 wherein the first and second helically splined portions have dissimilar pitches oppositely disposed.

8. The vibratory mechanism of claim 1 wherein the first eccentric includes an internal space, the second eccentric is disposed substantially within the internal space, the vibratory mechanism further comprising a linear actuator disposed to provide linear movement to the key shaft and a motor disposed to provide rotary movement to the first eccentric, the first eccentric being adapted to convey rotary movement to the key shaft, and the key shaft is adapted to provide rotary motion to the second eccentric as the key shaft rotates and is linearly displaced.

9. A compaction machine comprising:
   a main frame;
   at least one compaction drum;
   a vibratory mechanism associated with said compaction drum, the vibratory mechanism including
      a first eccentric defining a first internally helically splined bore therein;
      a second eccentric defining a second internally helically splined bore therein; and
      a key shaft including a first helically splined portion and a second helically splined portion, the first helically splined portion being complimentary to and disposed at least partially within the first internally helically splined bore, the second helically splined portion being complimentary to and disposed at least partially within the second internally helically splined bore, the first and second helically splined portions being oppositely splined wherein the first eccentric is adapted to provide rotary motion to the key shaft, and the key shaft is adapted to provide rotary motion to the second eccentric.

10. The compaction machine of claim 9 wherein the first eccentric is disposed within the at least on roller and includes an internal space, and the second eccentric being disposed substantially within the internal space of the first eccentric.

11. The compaction machine of claim 9 wherein the key shaft is disposed for linear movement.

12. The compaction machine of claim 11 further comprising a linear actuator disposed to provide linear movement to the key shaft.

13. The compaction machine of claim 9 further comprising a motor disposed to provide rotary movement to the first eccentric.

14. The compaction machine of claim 9 wherein the first and second helically splined portions have substantially like pitches disposed oppositely.

15. The compaction machine of claim 9 wherein the first and second helically splined portions have dissimilar pitches oppositely disposed.

16. A method of operating a vibratory mechanism of a compaction machine, the method comprising:
   disposing a first eccentric within a roller of the compaction machine;
   disposing a second eccentric substantially within the first eccentric;
   disposing a first helically splined portion of a key shaft at least partially within a first internally helically splined bore in the first eccentric;

disposing a second helically splined portion of the key shaft at least partially within a second internally helically splined bore in the second eccentric, the first and second helically splined portions being oppositely splined;

providing rotation to the first eccentric, the first eccentric providing rotary motion to the key shaft by way of the first helically splined bore engaging with the first helically splined portion; and linearly traversing the key shaft to provide rotary motion to the second eccentric in a rotary direction opposite to a direction of rotation of the first eccentric.

17. The method of claim 16 further including actuating a linear actuator to linearly traverse the key shaft.

18. The method of claim 16 further including operating a motor to provide rotation to the first eccentric.

* * * * *